(12) United States Patent
Moxon et al.

(10) Patent No.: US 10,773,170 B2
(45) Date of Patent: *Sep. 15, 2020

(54) METHOD FOR MOBILE GAMING SYSTEMS

(71) Applicants: Jonathan Moxon, Jacksonville, CA (US); Elena Moxon, Jacksonville, FL (US)

(72) Inventors: Jonathan Moxon, Jacksonville, CA (US); Elena Moxon, Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/954,598

(22) Filed: Apr. 17, 2018

(65) Prior Publication Data

US 2018/0296924 A1  Oct. 18, 2018

Related U.S. Application Data

(63) Continuation of application No. 14/853,687, filed on Sep. 14, 2015, now Pat. No. 9,950,263.

(60) Provisional application No. 62/071,136, filed on Sep. 15, 2014.

(51) Int. Cl.
| | | |
|---|---|---|
| *A63F 9/24* | (2006.01) |
| *A63F 13/77* | (2014.01) |
| *A63F 13/211* | (2014.01) |
| *A63F 13/24* | (2014.01) |
| *A63F 13/2145* | (2014.01) |

(52) U.S. Cl.
CPC ............ *A63F 13/77* (2014.09); *A63F 13/211* (2014.09); *A63F 13/2145* (2014.09); *A63F 13/24* (2014.09)

(58) Field of Classification Search
None
See application file for complete search history.

(56) References Cited

U.S. PATENT DOCUMENTS

| | | | | |
|---|---|---|---|---|
| 8,907,891 B2* | 12/2014 | Zhu | .................. | A63F 13/355 345/156 |
| 8,961,307 B2* | 2/2015 | Akifusa | .................. | A63F 13/26 463/31 |
| 9,030,410 B2* | 5/2015 | Shimohata | .............. | A63F 13/26 345/156 |
| 9,370,712 B2* | 6/2016 | Hayashi | .................. | A63F 13/20 |
| 2008/0273734 A1* | 11/2008 | Solland | ................. | G06F 1/1632 381/334 |
| 2008/0305873 A1* | 12/2008 | Zheng | .................... | A63F 13/06 463/37 |
| 2016/0171771 A1* | 6/2016 | Pedrotti | ............... | G02B 27/017 345/633 |

* cited by examiner

*Primary Examiner* — Sunit Pandya
(74) *Attorney, Agent, or Firm* — Ariel S. Bentolila; Bay Area IP Group, LLC

(57) ABSTRACT

A system and method including a mobile gaming device which may execute a computer code and/or software from a non-transitory computer readable memory for initializing an operating system and gaming modules. A user may input commands via a plurality of user input controls. Control components may be substituted with one or more alternative control components to maximize a user's comfort when using the mobile gaming device.

20 Claims, 16 Drawing Sheets

METHOD FOR MOBILE GAMING SYSTEMS

CROSS-REFERENCE TO RELATED APPLICATIONS

The present Utility patent application claims priority benefit of the U.S. provisional application for patent Ser. No. 62/071,136 filed on 15 Sep. 2014 under 35 U.S.C. 119(e), and U.S. Utility patent application Ser. No. 14/853,687 and entitled "A METHOD FOR MOBILE GAMING SYSTEMS", filed on 14 Sep. 2015 under 35 USC 111(a). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to systems and methods for mobile computing. More particularly, the invention relates to a system and method for mobile gaming.

BACKGROUND OF THE INVENTION

Typically, users play on gaming consoles as a recreational past-time. Often users may carry and play on mobile gaming consoles to pass time while performing everyday tasks and/or chores. A user may, generally, also carry other electronic devices such as, but not limited to, smart phones, laptops, or smart watches. Carrying multiple electronic devices may be burdensome to a user and sometimes a user may not find it practical to carry so many devices while performing everyday tasks.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that mobile gaming consoles may be designed with networking capabilities.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1A:
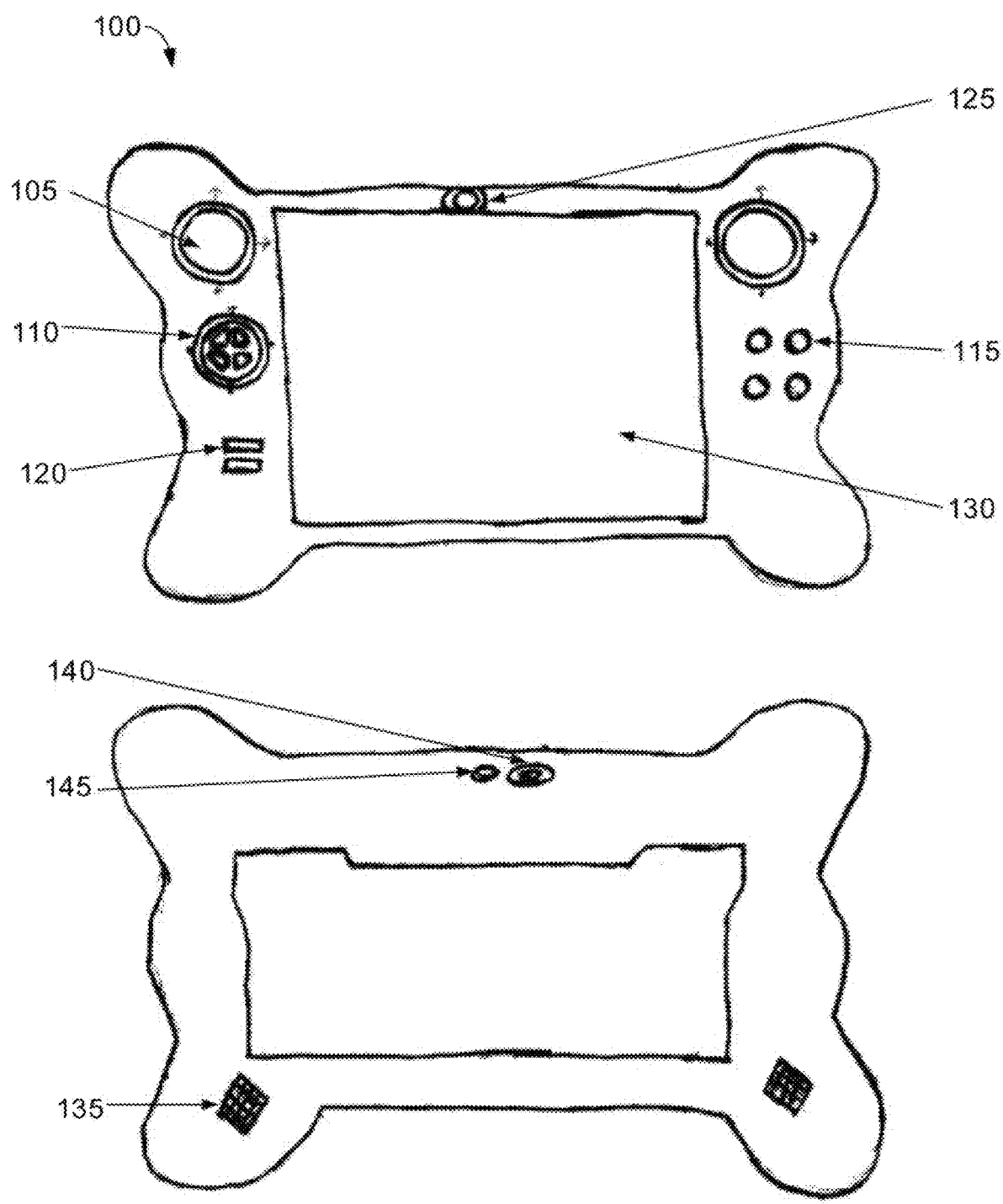
FIG. 1A illustrates the front and back of an exemplary mobile gaming console, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term" substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter. Moreover, for any claim of the present invention which claims an embodiment "consisting essentially of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of" where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java.™., Jini.™., C, C++, Smalltalk, Perl, UNIX Shell, Visual Basic or Visual Basic Script, Virtual Reality Markup Language (VRML), ColdFusion.™. or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Some embodiments of the present invention may provide means and/or methods for mobile gaming. Some of these embodiments may comprise computer software. In some of these embodiments, software may be integrated into hardware, including, without limitation, uniquely-designed hardware for running embodiment software.

FIG. 1A illustrates the front and back of an exemplary mobile gaming console 100, in accordance with an embodiment of the present invention. The front of mobile gaming console 100 may comprise of one or more navigation sticks 105, a directional pad 110, one or more control buttons 115, one or more system buttons 120, a camera 125, and a touchscreen 130. The back of mobile gaming console 100 may comprise of one or more speakers 135, a rear camera 140, and a flash light 145. Mobile gaming console 100 may be manufactured with virtually any electronic component mounting technology including, without limitation, ball grid arrays, fine ball grid arrays, dual in-line packages, surface mount technology, through-hole insertion, fine pitch technology, ultra-fine pitch technology, array surface mounts, column grid arrays, chip scale packages, and/or fine ball grid arrays. Mobile gaming console 100 may be manufactured in a small form factor and/or with high chip density by implementing a combination of ball grid array and/or fine ball grid array components on embedded passive component printed circuit board assembly technologies. A device interior and/or exterior for mobile gaming console 100 may be made to industry standards such as, but not limited to, IPX67 or IPX57. The device interior and/or exterior may be manufactured from virtually any material and any manufacturing process such as, but not limited to, injection molding with polycarbonates.

Mobile gaming console 100 may have a plurality of user input controls including, without limitation, navigational sticks 105, directional pad 110, control buttons 115, system buttons 120, and touchscreen 130. In the present embodiment of the invention, navigational sticks 105 may allow a user to select software objects and/or to navigate in directions including, without limitation, up, down, left, and right, in continuous increments as an analog input. A directional pad 110 may allow for a user to select software objects and/or to navigate in directions including, without limitation, up, down, left, and right, in discrete increments as a digital input. Control buttons 115 may be mapped to virtually any function including, without limitation, accept an option, decline an option, return to previous menu, and option to save to device or memory card. System buttons 120 may be mapped to system functions such as, but not limited to, turning a device on and off, returning to a home menu, automatically ask to save before shutting down the device. Touchscreen 130 may allow a user to operator a software cursor and/or select software objects in programs running on mobile gaming console 100.

During typical operation, mobile gaming device 100 may execute computer code and/or software from a non-transitory computer readable memory. A user may input commands via a plurality of user input controls including, without limitation, navigational sticks 105, directional pad 110, control buttons 115, system buttons 120, and touchscreen 130. A camera 125 and a rear camera 140 may gather video information for applications including, without limitation, social media, gaming, facial recognition, to automatically start the device as a safety feature. A flash light 145 may improve lighting conditions for cameras 125 and 145 and/or illuminate an area for a user. A user may interface with touchscreen 130 and speakers 135 to view and hear the results of any running computer code and/or software on mobile gaming device 100.

It may be appreciated by a person with ordinary skill in the art, in light of and in accordance with the teachings of the present invention, that the device interior and/or exterior for mobile gaming console 100 may be made from virtually any material to achieve virtually any desired characteristic. Mobile gaming console 100's interior and/or exterior may be made from materials with special properties such as, but not limited to, electromagnetic shielding with metal foil, inexpensive manufacturing costs with polycarbonate and carbon fiber for durability. In an alternative embodiment of the present invention, the interior and/or exterior of mobile gaming device 100 may be made from aluminum to dissipate heat passively.

It may be appreciated by a person with ordinary skill in the art, in light of and in accordance with the teachings of the present invention, that mobile gaming console 100 may be designed to meet manufacturing requirements. Mobile gaming console 100 may be designed in ways such as, but not limited to, implementing DIP chips for low quantity manufacturing, implementing BGA chips for mass production. In another embodiment of the present invention, area array component packages are used for high quantity manufacturing with relatively inexpensive machinery.

It may be appreciated by a person with ordinary skill in the art, in light of and in accordance with the teachings of the present invention, that all control components such as navigational sticks 105, directional pad 110, control buttons 115, system buttons 120, and touchscreen 130 may be substituted with one or more alternative control components. Alternative control components include, but are not limited to, light sensors, accelerometers, keyboards, trackpads. In an alternative embodiment of the present invention, an accelerometer and gyroscope sensor may be used to trace a mobile gaming console 100's movement. In another embodiment of the present invention, all control components may be arranged in a way to maximize a user's comfort when using mobile gaming console 100.

It may be appreciated by a person with ordinary skill in the art, in light of and in accordance with the teachings of the present invention, that all elements of mobile gaming console 100 may be located anywhere on mobile gaming console 100 and in any number. In another embodiment of the present invention, mobile gaming console 100 may comprise of only push buttons for controls.

Figure 1B:
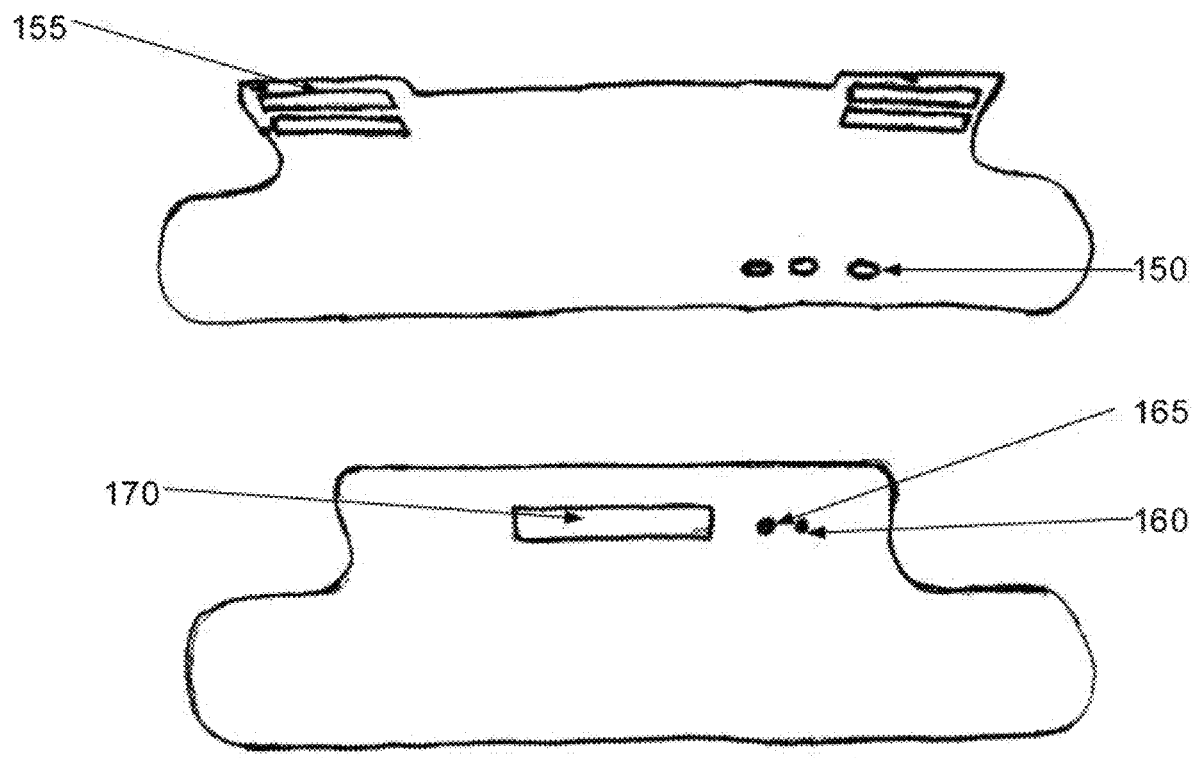
FIG. 1B illustrates the top and bottom of an exemplary mobile gaming console, in accordance with an embodiment of the present invention.

FIG. 1B illustrates the top and bottom of an exemplary mobile gaming console 100, in accordance with an embodiment of the present invention. The top of mobile gaming console 100 may comprise of a plurality of system controls 150 and one or more shoulder buttons 155. The bottom of mobile gaming console may comprise of a reset button 160, a headphone jack 165, and a docking port 170. In the present embodiment of the invention, system controls 150 may be push buttons configured to increase or decrease system volume as well as power on and off mobile gaming console 100. Shoulder buttons 155 may be configured for switching views and display zooming. An indented reset button 160 may allow for a hardware reset for mobile gaming console 100. Peripherals such as, but not limited to, headphones, microphones, microphone headset and Bluetooth earpiece may be connected to mobile gaming console 100 via headphone jack 165. A docking station may couple with mobile gaming console 100 via docking port 170.

It may be appreciated by a person with ordinary skill in the art, in light of and in accordance with the teachings of the present invention, that headphone jack 165 may be substituted for any peripheral jack and/or socket. Peripheral jacks and/or sockets may include, but not limited to, HDMI sockets, and coaxial couplers. In another embodiment of the present invention, headphone jack 165 may be an optical port.

It may be appreciated by a person with ordinary skill in the art, in light of and in accordance with the teachings of the present invention, that docking port 170 may accept any sort of connection. Connections include, but are not limited to, recharging plugs, Ethernet ports, and USB ports. In another embodiment of the present invention, docking port 170 may be a SATA connector.

Figure 1C:
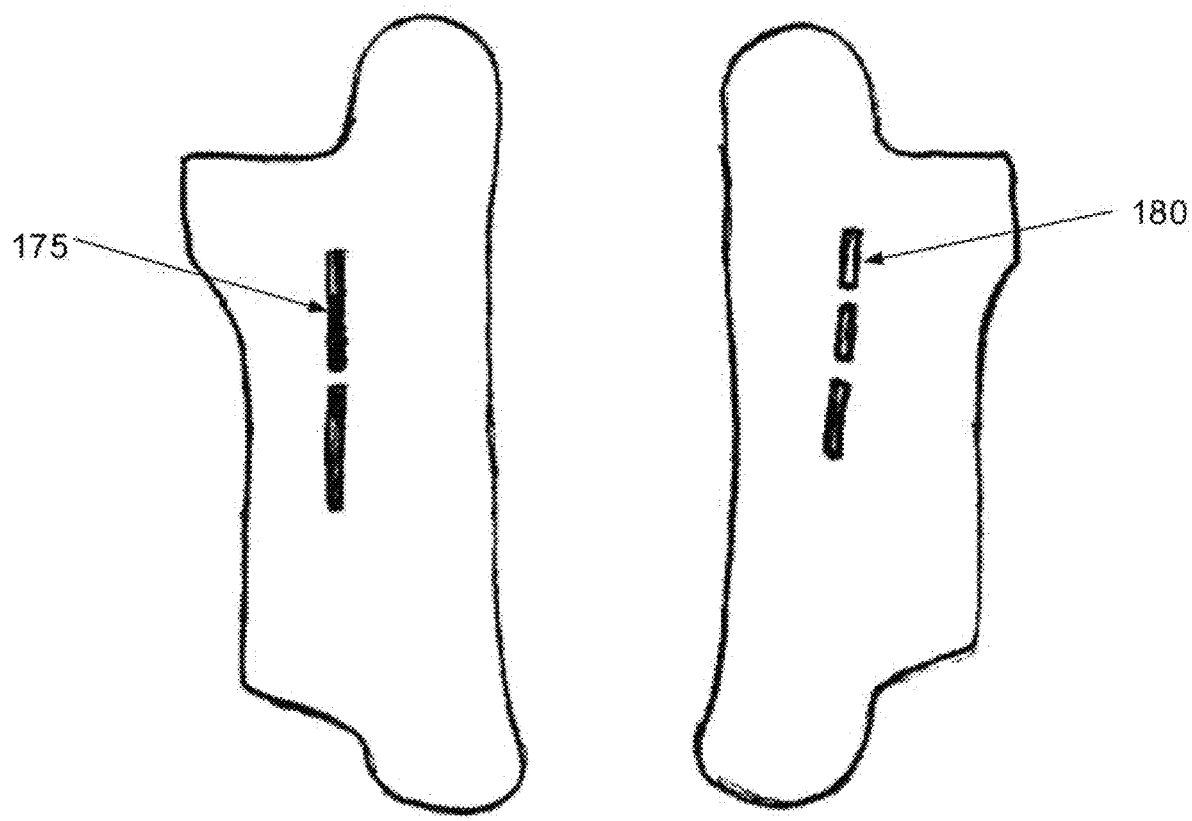
FIG. 1C illustrates the left and right sides of an exemplary mobile gaming console, in accordance with an embodiment of the present invention.

FIG. 1C illustrates the left and right sides of an exemplary mobile gaming console 100, in accordance with an embodiment of the present invention. The right side of mobile gaming console 100 may comprise of one or more removable storage slots 175 and the left side of mobile gaming console 100 may comprise of one or more connection ports 180. In the present embodiment of the invention, removable storage slots 175 may be storage slots for different memory technologies including, but not limited to, propriety game cartridges, and microSD cards. Connection ports 180 may be ports for virtually any wired communications protocol including, but not limited to, Universal Serial Bus, and SATA.

It may be appreciated by a person with ordinary skill in the art, in light of and in accordance with the teachings of the present invention, that removable storage slots 175 may be used to access or store storage devices for various media files. In another embodiment of the present invention, removable storage slots 175 may accept SD cards to store downloaded media files, software, and/or games. In yet another embodiment of the present invention, removable storage slots 175 may be used to accept game cartridges, discs, and/or media cards.

It may be appreciated by a person with ordinary skill in the art, in light of and in accordance with the teachings of the present invention, that one or more connection ports 180 may be used to connect to virtually any peripheral. One or more connection ports 180 may connect to, but not limited to, hardware accessories, speakers, smartphones, and other handheld all in one electronic devices. In another embodiment of the present invention, one or more connection ports 180 may allow for a wired connection to a computer.

Figure 2A:
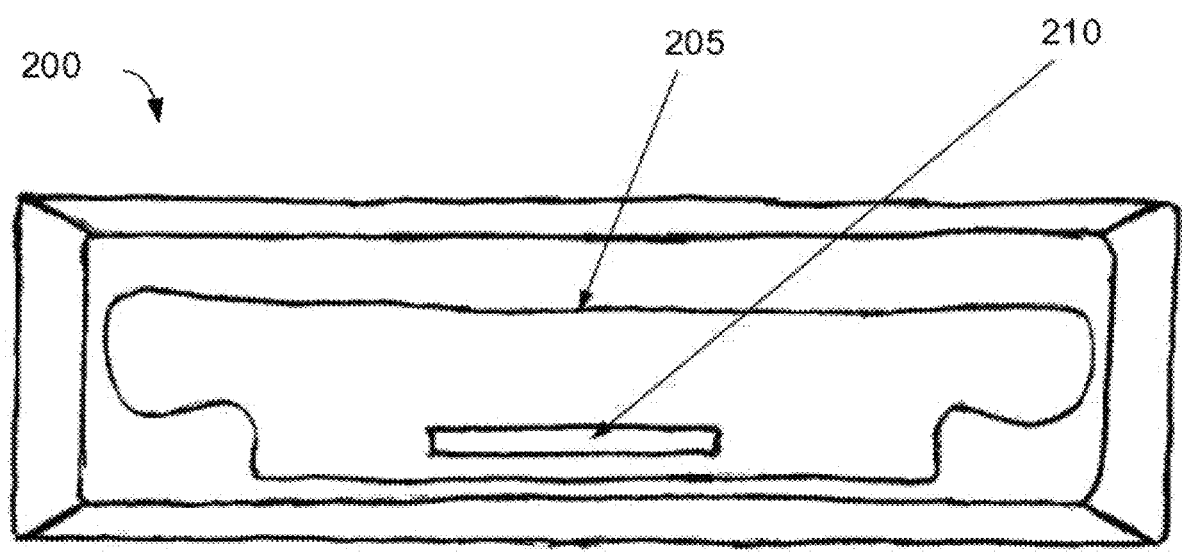
FIG. 2A illustrates the top of an exemplary docking station, in accordance with an embodiment of the present invention.

FIG. 2A illustrates the top of an exemplary docking station 200, in accordance with an embodiment of the present invention. A docking station 200 may comprise of a docking cradle 205 and a docking connector 210. Docking cradle 205 may be designed to hold a mobile gaming console 100 in a certain position while docked to docking station 200. A docking connector 210 connects to a mobile gaming console 100's docking port 170 and may deliver and/or receive electrical signals and/or power from mobile gaming console 100.

During typical operation, a user connects a mobile gaming console 100 to docking station 200 and docking station 200 may receive control of certain signals such as, but not limited to, audio signals, device metadata, network signals, amber alerts, weather alerts and alarm/emergency system notifications.

It may be appreciated by a person with ordinary skill in the art, in light of and in accordance with the teachings of the present invention, that docking cradle 205 may by created in any form and any number. In an alternative embodiment of the present invention, docking cradle 205 may be formed in the footprint of a generic smartphone and/or a mobile gaming console 100, in order to accommodate both devices.

It may be appreciated by a person with ordinary skill in the art, in light of and in accordance with the teachings of the present invention, that all elements of docking station 200 may be located anywhere and/or in any number on docking station 200. In another embodiment of the present invention, additional docking cradles 205 and docking connector 210 may be located on the sides of docking station 200 to accommodate additional mobile gaming consoles 100.

Figure 2B:
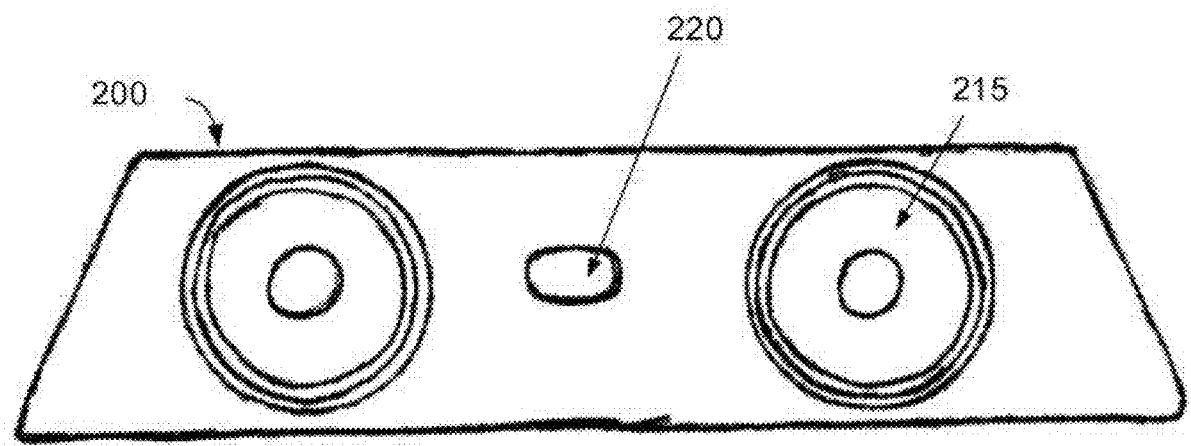
FIG. 2B illustrates the front of an exemplary docking station, in accordance with an embodiment of the present invention.

FIG. 2B illustrates the front of an exemplary docking station 200, in accordance with an embodiment of the present invention. The front of docking station 200 may comprise of one or more speakers 215 and an indicator light 220. The one or more speakers may be configured to augment or take priority over a mobile gaming console's audio functions. An indicator light 220 may be configured to signify virtually any information such as, but not limited to, a mobile gaming console 100 is properly docked to docking station 200, a mobile gaming console 100 is charging including a red light for charging and light blue to indicate fully charge.

It may be appreciated by a person with ordinary skill in the art, in light of and in accordance with the teachings of the present invention, that any number and type of peripheral components may be added to docking station 200. Peripheral components may be, but are not limited to, additional speakers, microphones, cameras, LEDs, sensors and alarm clocks. In an alternative embodiment of the present invention, additional display screens may be integrated with docking station 200 to allow a user to view data from mobile gaming console 100 on a larger or multiple display screens.

Figure 3:
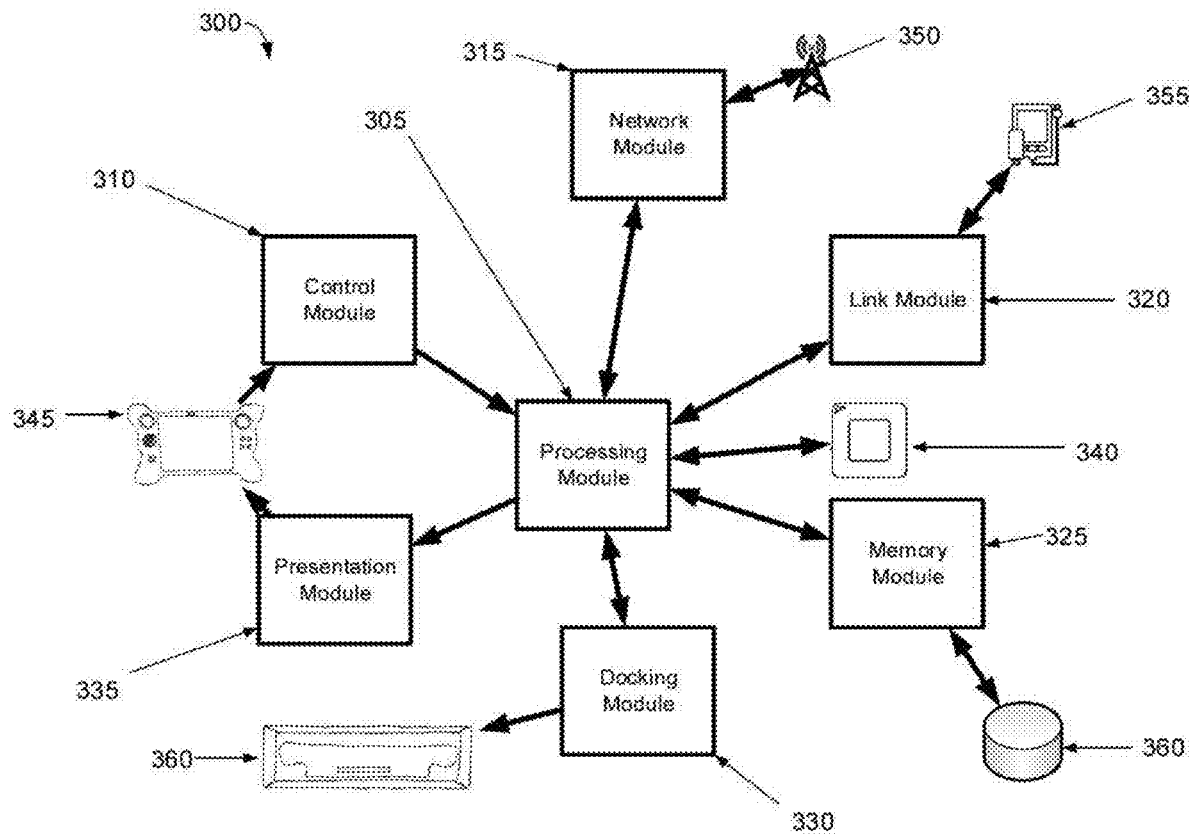
FIG. 3 illustrates the architecture of an exemplary system for mobile gaming, in accordance with an embodiment of the present invention.

FIG. 3 illustrates the architecture of an exemplary system for mobile gaming, in accordance with an embodiment of the present invention. A mobile gaming system 300 may comprise of a processing module 305, a control module 310, a network module 315, a link module 320, a memory module 325, a docking module 330, and a presentation module 335. A processing module 305 has a means to process and/or execute computer code such as, but not limited to, a computer processor 340. A control module 310 may receiver user input from devices capable of interacting with a user such as, but not limited to, buttons on a mobile gaming console 345, and a touch screen. A network module 315 has a means to connect to a network including, but not limited to, a wireless transceiver 350. A link module 320 may link with another electronic device and/or peripheral via a linking means, such as USB connection 355. A memory module 325 may interface with memory devices 360 including, but not limited to, hard drives, and memory cards by means including, but not limited to, memory card readers, and wired connections. A docking module has a means such as, but not limited to, a docking station 365 to dock with an electronic device to recharge and/or augment the capabilities of a docked electronic device. A presentation module 335 presents the results of a completed task and/or action to a user by means such as, but not limited to, a screen on a mobile gaming console 345, speakers, and vibration.

During typical operation, a processing module 305 may run computer code and/or software from a non-transitory computer readable medium, a memory device 360, and/or a networked or linked computing device. Additional computer code including, but not limited to, software, programs, and applets may be retrieved from memory devices 360 via memory module 325, from linked electronic devices via link module 320, and/or from a network via network module 315. A presentation module 335 may process any processing results from the processing module and format the results for one or more presentation mediums including, but not limited to, display screens, and speakers. If a mobile gaming system is docked to a docking station 365, formatted data may be forwarded to the docking station 365 for presentation.

It may be appreciated by a person with ordinary skill in the art, in light of and in accordance with the teachings of the present invention, that network module 315 may connect to virtually any network with the proper wireless transceiver 350. Network module 315 may connect to networks including, but not limited to, GSM, CDMA, XM, and WiFi. In another embodiment of the present invention, mobile gaming console may act as a 4G Hotspot with a 4G transceiver connected to a network module 315.

It may be appreciated by a person with ordinary skill in the art, in light of and in accordance with the teachings of the present invention, that link module 320 may connect to virtually any electronic device wirelessly. Link module 320 may be coupled with a wireless transceiver including, but not limited to, a Bluetooth transceiver, and radio transceiver. In another embodiment of the present invention, a user may connect to a smart phone via Bluetooth and make calls from mobile gaming console 100. In yet another embodiment of the present invention, mobile gaming console 100 may connect to any device such as, but not limited to, a smart television, and a computer and remotely operate linked devices.

It may be appreciated by a person with ordinary skill in the art, in light of and in accordance with the teachings of the present invention, mobile gaming system 300 may function with or without one or more modules. In another embodiment of the present invention, network module 315 and link module 320 may be removed from mobile gaming system 300 and a mobile gaming console 100 may operate in a standalone mode.

Figure 4:
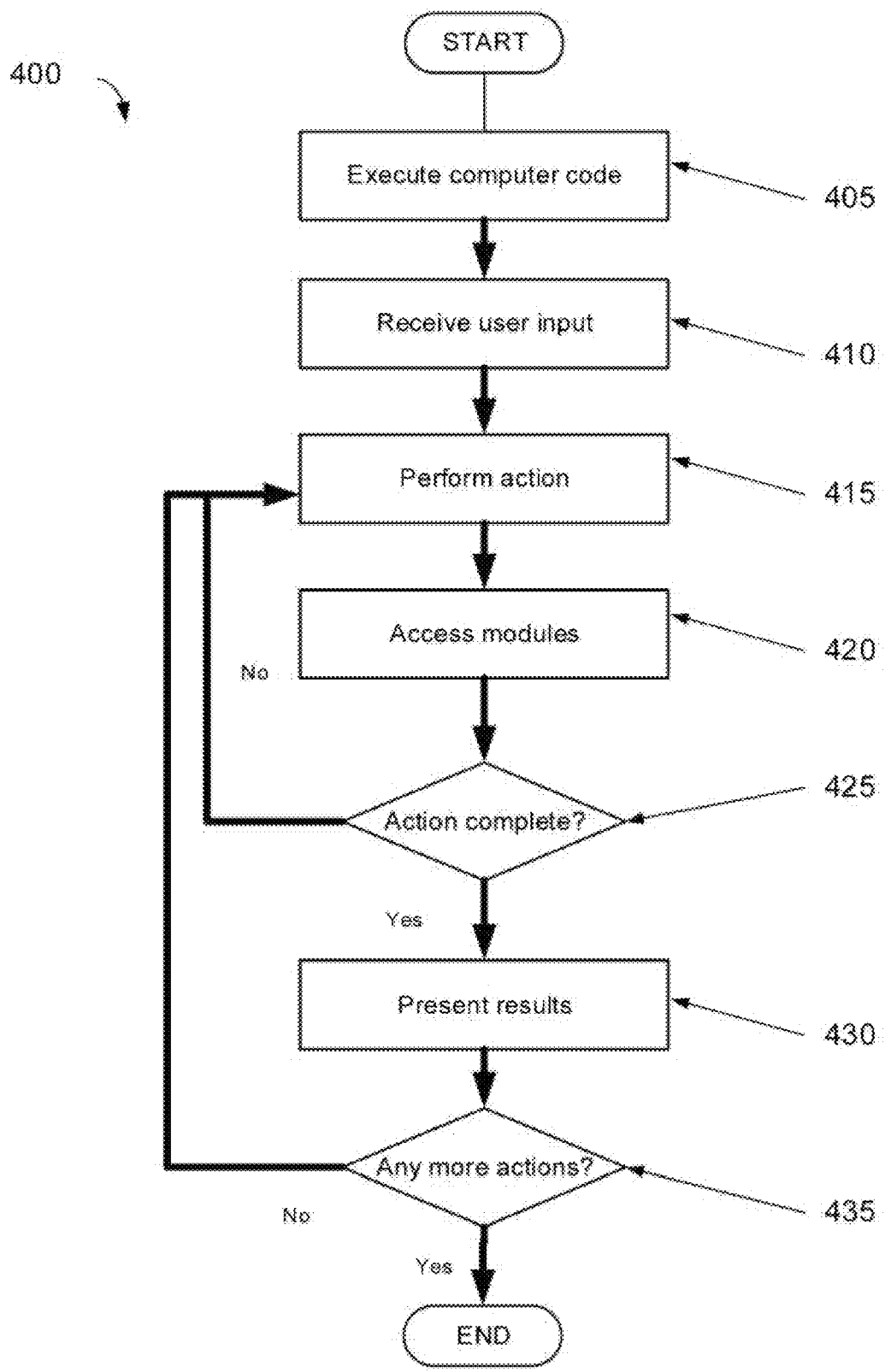
FIG. 4 is a flow chart illustrating an exemplary process for mobile gaming, in accordance with an embodiment of the present invention.

FIG. 4 is a flow chart illustrating an exemplary process for mobile gaming, in accordance with an embodiment of the present invention. A mobile gaming process 400 begins at an execute computer code step 405. In execute computer code step 405, an operating system and/or device initializing software is run by a processing means which may include, but not limited to, a processor, a non-transitory computer readable medium, and RAM. In a receive user input step 410, a user may interact with an input component on a mobile gaming console 100 including, but not limited to, push buttons, a touch screen, switches, and triggers. Input from a user may be converted to a command and an action is initialized in response to a command in a perform action step 415. In an access modules step 420, other peripheral components and/or modules may be accessed for the execution of an action. A check for action completion step 425 is performed to check whether an action has successfully been completed. If an action is still processing and/or awaiting a response from a mobile gaming console 100's modules, mobile gaming process 400 returns to the perform action step 415. If an action is done processing, any results are presented to a user in a present results step 430. A check for any further actions is performed in a check for process completion step 435. If additional actions must be performed, then mobile gaming process 400 returns to the perform action step 415.

It may be appreciated by a person with ordinary skill in the art, in light of and in accordance with the teachings of the present invention, that one or more steps in mobile gaming process 400 may be added, removed, or rearranged. In other embodiments of the present invention, the order of steps in mobile gaming process 400 may occur in any order. In still other embodiments of the present invention, additional steps may be added to mobile gaming process 400.

Figure 5:
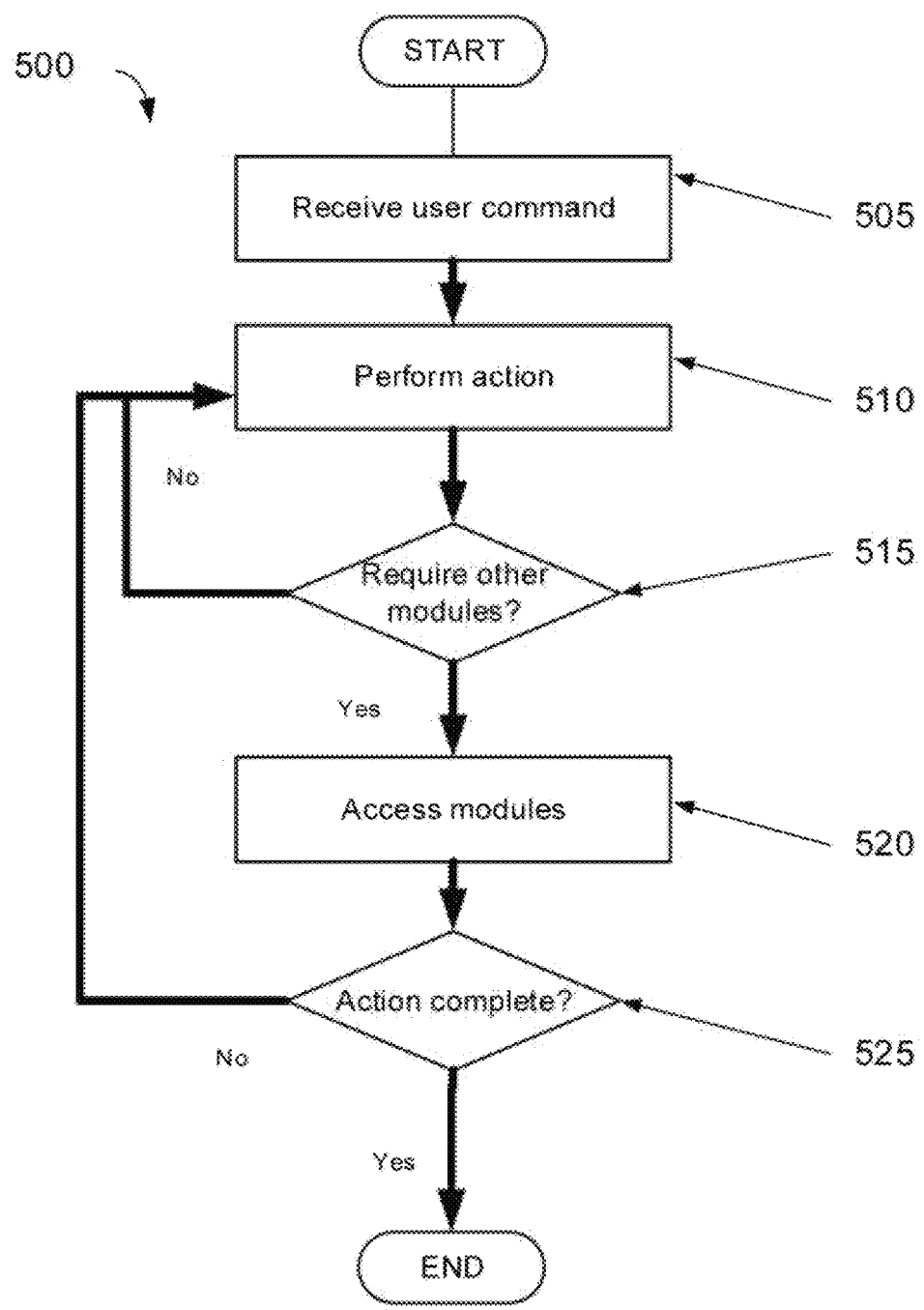
FIG. 5 is a flow chart illustrating an exemplary process for mobile processing on a processing module, in accordance with an embodiment of the present invention.

FIG. 5 is a flow chart illustrating an exemplary process for mobile processing on a processing module, in accordance with an embodiment of the present invention. A mobile processing process 500 begins with a receive user command step 505. An action is performed according to computer code and/or software stored on a non-transitory computer readable medium in a perform action step 510. A check for whether a processing module requires the capabilities of other modules is performed at a check for other modules step 515. If other modules are require for the execution of an action, an access other modules step 520 is performed. During access other modules step 520, any requests and/or data is sent from the processing module to any necessary modules. Once access has been granted from other modules or if other modules are not necessary for executing an action, a check to see if the processing module is done executing an action is performed at a check action complete step 525. In the case where an action is not done executing and/or a subsequent action needs to be executed, the mobile processing process 500 returns to the perform action step 510.

It may be appreciated by a person with ordinary skill in the art, in light of and in accordance with the teachings of the present invention, that one or more steps in mobile processing process 500 may be added, removed, or rearranged. In some embodiments of the present invention, mobile processing process 500 may omit some steps. In other embodiments of the present invention, the order of steps in mobile processing process 500 may occur in any order. In still other embodiments of the present invention, additional steps may be added to mobile processing process 500.

Figure 6:
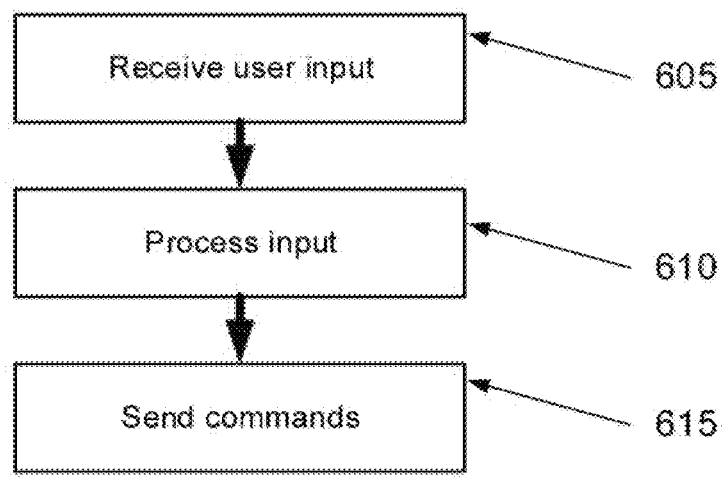
FIG. 6 is a flow chart illustrating an exemplary process for gathering user input on a control module, in accordance with an embodiment of the present invention.

FIG. 6 is a flow chart illustrating an exemplary process for gathering user input on a control module, in accordance with an embodiment of the present invention. A gather user input process 600 begins with a receive user input step 605. A user may interact with an input device such including, without limitation, a touchscreen, push buttons, and switches. Interaction information is received by a control module as user input and may be processed into commands by a processing means, such as a processor, in a process input step 610. The processed input may then be sent to a processing module in a send commands step 615.

It may be appreciated by a person with ordinary skill in the art, in light of and in accordance with the teachings of the present invention, that one or more steps in gather user input process 600 may be added, removed, or rearranged. In some embodiments of the present invention, gather user input process 600 may omit some steps. In other embodiments of the present invention, the order of steps in gather user input process 600 may occur in any order. In still other embodiments of the present invention, additional steps may be added to gather user input process 600.

Figure 7:
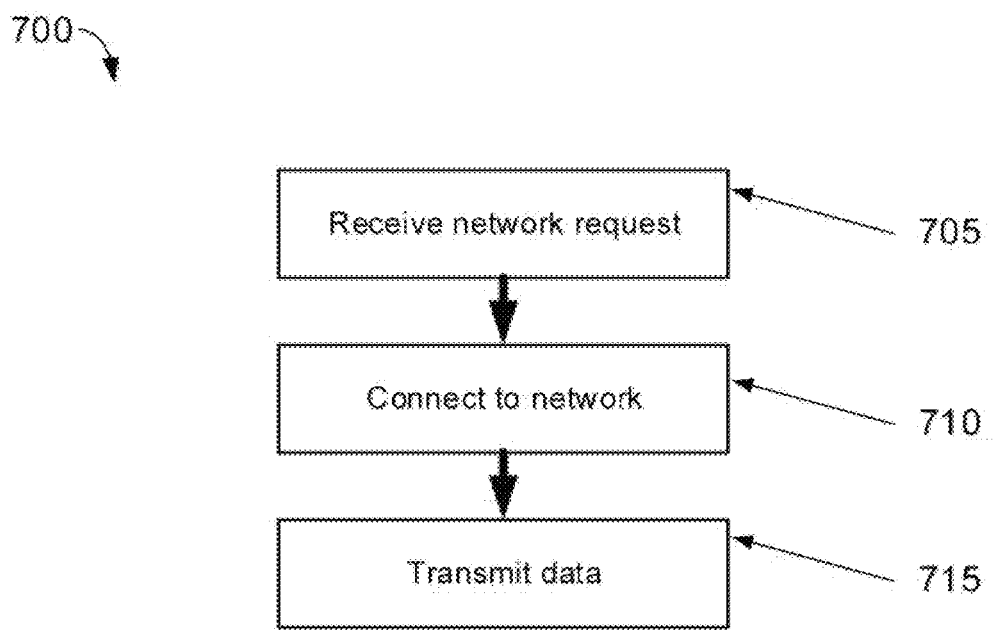
FIG. 7 is a flow chart illustrating an exemplary process for connecting to a network on a network module, in accordance with an embodiment of the present invention.

FIG. 7 is a flow chart illustrating an exemplary process for connecting to a network on a network module, in accordance with an embodiment of the present invention. A connect to network process 700 begins with a receive network request step 705. A network module receives a request to connect with a network in receive network request step 705. A connection with a network is created in a connect to network step 710. Data may then be transferred over a network in transmit data step 715.

It may be appreciated by a person with ordinary skill in the art, in light of and in accordance with the teachings of the present invention, that one or more steps in connect to network process 700 may be added, removed, or rearranged. In some embodiments of the present invention, connect to network process 700 may omit some steps. In other embodiments of the present invention, the order of steps in connect to network process 700 may occur in any order. In still other embodiments of the present invention, additional steps may be added to connect to network process 700.

Figure 8:
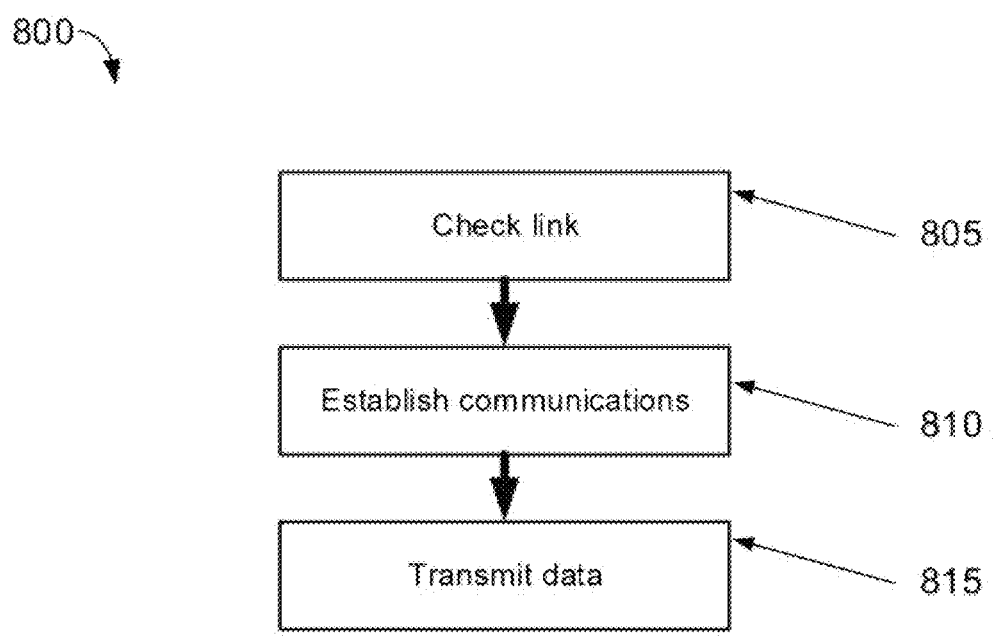
FIG. 8 is a flow chart illustrating an exemplary process for linking with a device on a link module, in accordance with an embodiment of the present invention.

FIG. 8 is a flow chart illustrating an exemplary process for linking with a device on a link module, in accordance with an embodiment of the present invention. A linking process 800 begins at a check link step 805 wherein a linking module checks for any links, which may be wired and/or wireless, from other devices and/or modules. An establish communications step 810 links a link module with corresponding device and/or module via a protocol such as, but not limited to, USB, and SATA. Data may be transferred between a linking module and a linked device and/or module in a transmit data step 815.

It may be appreciated by a person with ordinary skill in the art, in light of and in accordance with the teachings of the present invention, that one or more steps in linking process 800 may be added, removed, or rearranged. In some embodiments of the present invention, linking process 800 may omit some steps. In other embodiments of the present invention, the order of steps in linking process 800 may occur in any order. In still other embodiments of the present invention, additional steps may be added to linking process 800.

Figure 9:
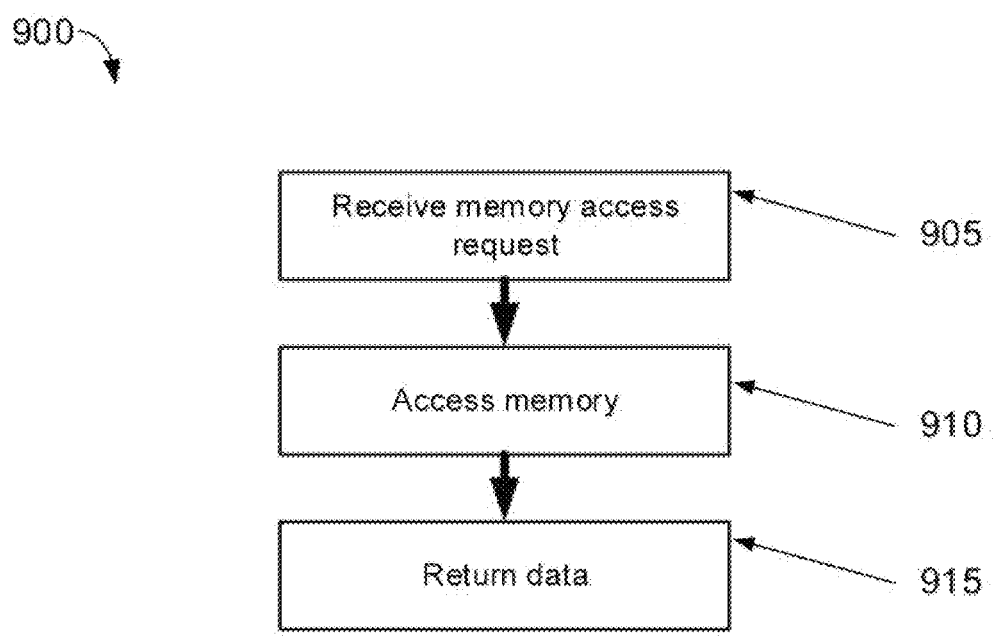
FIG. 9 is a flow chart illustrating an exemplary process for accessing memory on a memory module, in accordance with an embodiment of the present invention.

FIG. 9 is a flow chart illustrating an exemplary process for accessing memory on a memory module, in accordance with an embodiment of the present invention. An accessing memory process 900 begins at a receive memory access request step 905. A memory access request is received from a processing module and a corresponding memory storage device is accessed for reading and/or writing in access memory step 910. Data and/or memory access metadata is returned to the processing module in return data step 915.

It may be appreciated by a person with ordinary skill in the art, in light of and in accordance with the teachings of the present invention, that one or more steps in accessing memory process 900 may be added, removed, or rearranged. In some embodiments of the present invention, accessing memory process 900 may omit some steps. In other embodiments of the present invention, the order of steps in accessing memory process 900 may occur in any order. In still other embodiments of the present invention, additional steps may be added to accessing memory process 900.

Figure 10:
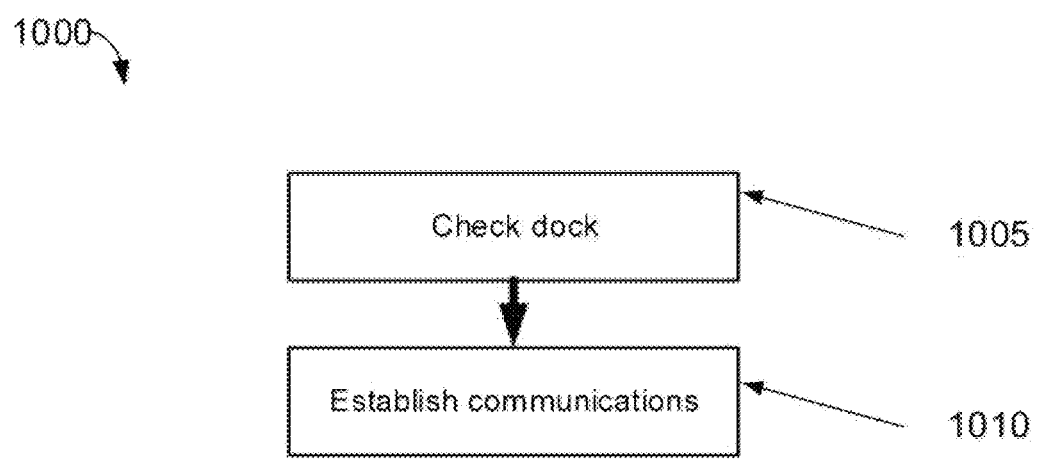
FIG. 10 is a flow chart illustrating an exemplary process for device docking on a docking module, in accordance with an embodiment of the present invention.

FIG. 10 is a flow chart illustrating an exemplary process for device docking on a docking module, in accordance with an embodiment of the present invention. A docking process 1000 begins at a check dock step 1005. A docking module checks for a docked mobile gaming console 100 in check dock step 1005. Once a mobile gaming console 100 is docked, a establish communications step 1010 is performed. Establish communications step 1010 receives any control signals from a mobile gaming console 100 and connects any electronic components and/or modules attached to the docking module with the docked mobile gaming console 100.

It may be appreciated by a person with ordinary skill in the art, in light of and in accordance with the teachings of the present invention, that one or more steps in docking process 1000 may be added, removed, or rearranged. In some embodiments of the present invention, docking process 1000 may omit some steps. In other embodiments of the present invention, the order of steps in docking process 1000 may occur in any order. In still other embodiments of the present invention, additional steps may be added to docking process 1000.

Figure 11:
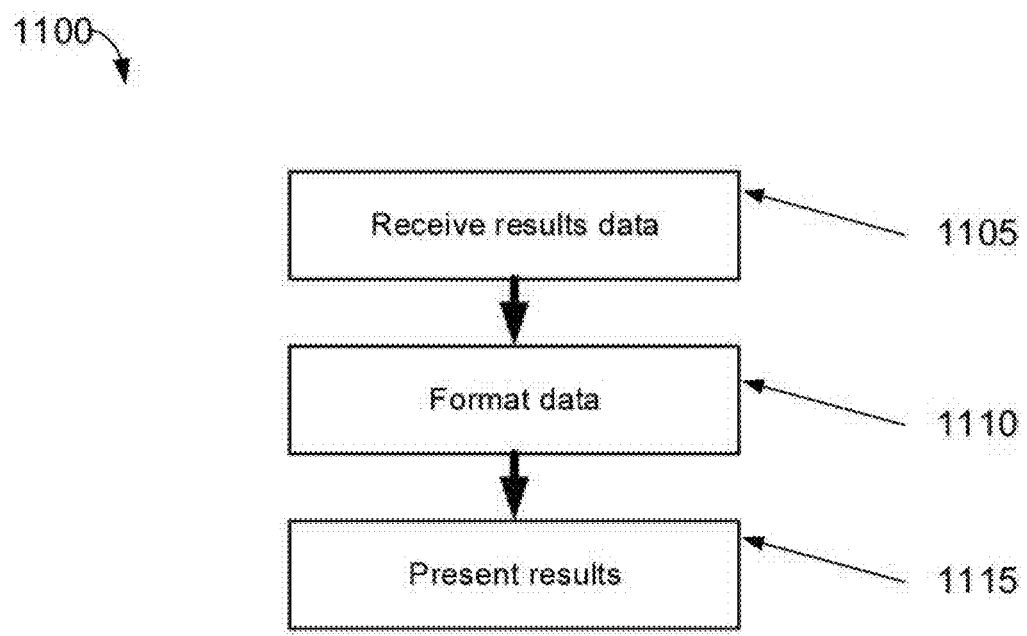
FIG. 11 is a flow chart illustrating an exemplary process for presenting results on an interface module, in accordance with an embodiment of the present invention.

FIG. 11 is a flow chart illustrating an exemplary process for presenting results on an interface module, in accordance with an embodiment of the present invention. A presenting results process 1100 begins with a receive results data step 1105. During receive results data step 1105, an interface module receives data associated with the execution results of a computer code and/or software running on a processing module. The received results data is formatted in a format data step 1110, wherein the data is converted, by a processing means such as a processor, for specific user interfaces such as, but not limited to, screens, speakers, keyboards, mouse, and remote control devices. A present results step 1115 presents the formatted data to a user through presentation means such as, but not limited to, screens, speakers, keyboards, mouse, and remote control devices.

It may be appreciated by a person with ordinary skill in the art, in light of and in accordance with the teachings of the present invention, that one or more steps in presenting results process 1100 may be added, removed, or rearranged. In some embodiments of the present invention, presenting results process 1100 may omit some steps. In other embodiments of the present invention, the order of steps in presenting results process 1100 may occur in any order. In still other embodiments of the present invention, additional steps may be added to presenting results process 1100.

Figure 12:
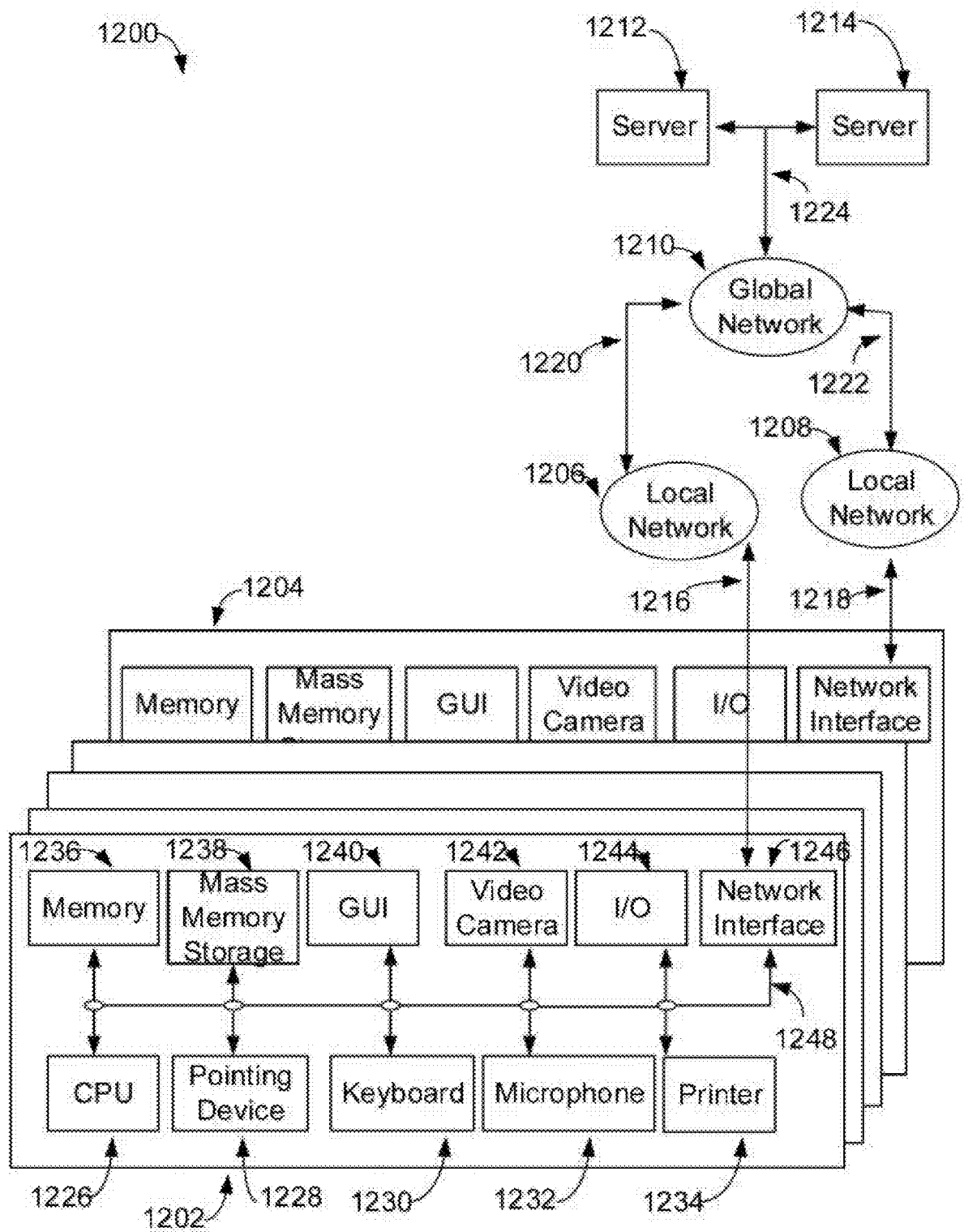
FIG. 12 is a block diagram depicting an exemplary client/server system which may be used by an exemplary web-enabled/networked embodiment of the present invention.

FIG. 12 is a block diagram depicting an exemplary client/server system which may be used by an exemplary web-enabled/networked embodiment of the present invention.

A communication system 1200 includes a multiplicity of clients with a sampling of clients denoted as a client 1202 and a client 1204, a multiplicity of local networks with a sampling of networks denoted as a local network 1206 and a local network 1208, a global network 1210 and a multiplicity of servers with a sampling of servers denoted as a server 1212 and a server 1214.

Client 1202 may communicate bi-directionally with local network 1206 via a communication channel 1216. Client 1204 may communicate bi-directionally with local network 1208 via a communication channel 1218. Local network 1206 may communicate bi-directionally with global network 1210 via a communication channel 1220. Local network 1208 may communicate bi-directionally with global network 1210 via a communication channel 1222. Global network 1210 may communicate bi-directionally with server 1212 and server 1214 via a communication channel 1224. Server 1212 and server 1214 may communicate bi-directionally with each other via communication channel 1224. Furthermore, clients 1202, 1204, local networks 1206, 1208, global network 1210 and servers 1212, 1214 may each communicate bi-directionally with each other.

In one embodiment, global network 1210 may operate as the Internet. It will be understood by those skilled in the art that communication system 1200 may take many different forms. Non-limiting examples of forms for communication system 1200 include local area networks (LANs), wide area networks (WANs), wired telephone networks, wireless networks, or any other network supporting data communication between respective entities.

Clients 1202 and 1204 may take many different forms. Non-limiting examples of clients 1202 and 1204 include personal computers, personal digital assistants (PDAs), cellular phones and smartphones.

Client 1202 includes a CPU 1226, a pointing device 1228, a keyboard 1230, a microphone 1232, a printer 1234, a memory 1236, a mass memory storage 1238, a GUI 1240, a video camera 1242, an input/output interface 1244, and a network interface 1246.

CPU 1226, pointing device 1228, keyboard 1230, microphone 1232, printer 1234, memory 1236, mass memory storage 1238, GUI 1240, video camera 1242, input/output interface 1244 and network interface 1246 may communicate in a unidirectional manner or a bi-directional manner with each other via a communication channel 1248. Communication channel 1248 may be configured as a single communication channel or a multiplicity of communication channels.

CPU 1226 may be comprised of a single processor or multiple processors. CPU 1226 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1236 is used typically to transfer data and instructions to CPU 1226 in a bi-directional manner. Memory 1236, as discussed previously, may include any suitable computer-readable media, intended for data storage, such as those described above excluding any wired or wireless transmissions unless specifically noted. Mass memory storage 1238 may also be coupled bi-directionally to CPU 1226 and provides additional data storage capacity and may include any of the computer-readable media described above. Mass memory storage 1238 may be used to store programs, data and the like and is typically a secondary storage medium such as a hard disk. It will be appreciated that the information retained within mass memory storage 1238, may, in appropriate cases, be incorporated in standard fashion as part of memory 1236 as virtual memory.

CPU 1226 may be coupled to GUI 1240. GUI 1240 enables a user to view the operation of computer operating system and software. CPU 1226 may be coupled to pointing device 1228. Non-limiting examples of pointing device 1228 include computer mouse, trackball and touchpad. Pointing device 1228 enables a user with the capability to maneuver a computer cursor about the viewing area of GUI 1240 and select areas or features in the viewing area of GUI 1240. CPU 1226 may be coupled to keyboard 1230. Keyboard 1230 enables a user with the capability to input alphanumeric textual information to CPU 1226. CPU 1226 may be coupled to microphone 1232. Microphone 1232 enables audio produced by a user to be recorded, processed and communicated by CPU 1226. CPU 1226 may be connected to printer 1234. Printer 1234 enables a user with the capability to print information to a sheet of paper. CPU 1226 may be connected to video camera 1242. Video camera 1242 enables video produced or captured by user to be recorded, processed and communicated by CPU 1226.

CPU 1226 may also be coupled to input/output interface 1244 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1226 optionally may be coupled to network interface 1246 which enables communication with an external device such as a database or a computer or telecommunications or internet network using an external connection shown generally as communication channel 1216, which may be implemented as a hardwired or wireless communications link using suitable conventional technologies. With such a connection, CPU 1226 might receive information from the network, or might output information to a network in the course of performing the method steps described in the teachings of the present invention.

Figure 13:
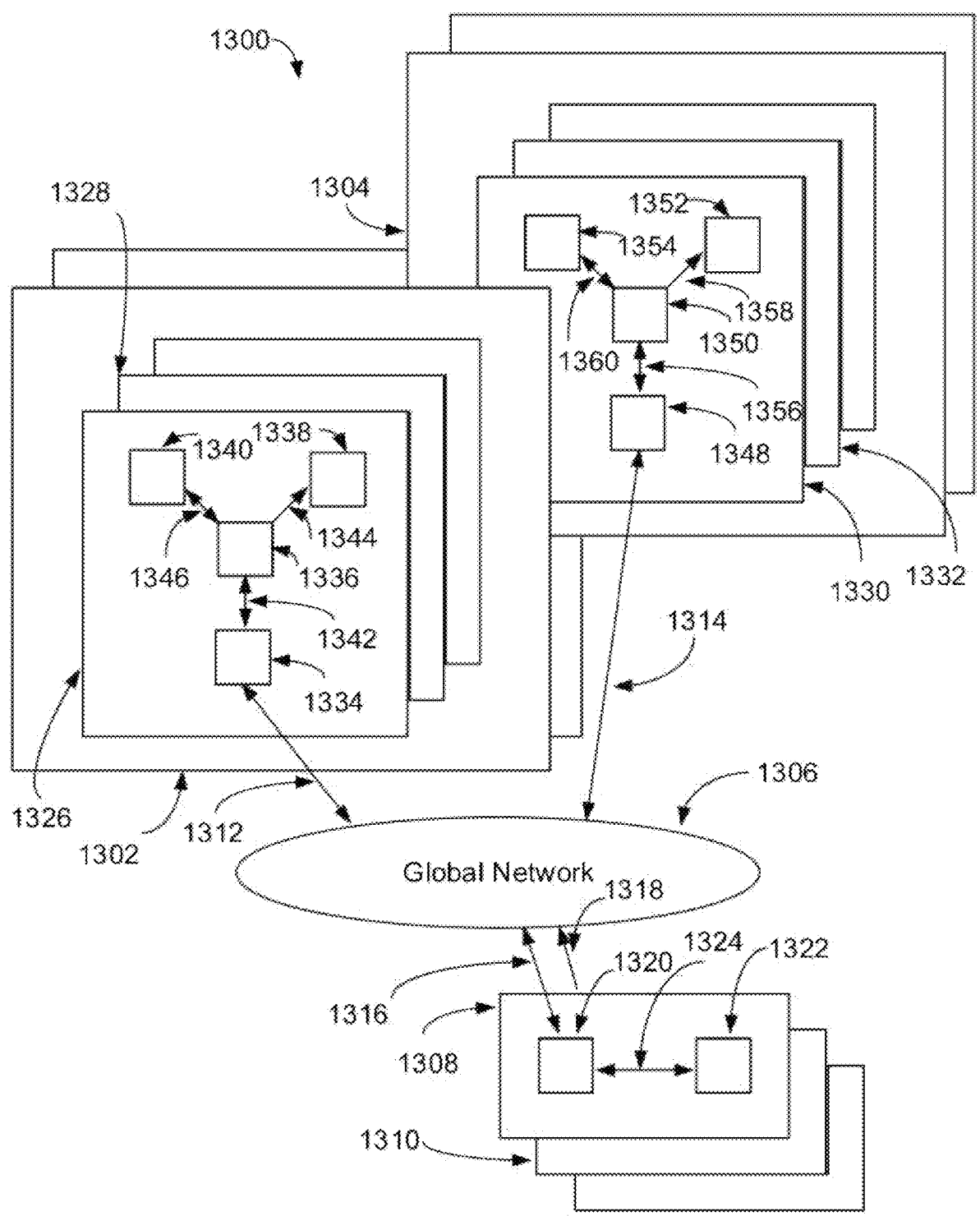
FIG. 13 illustrates a block diagram depicting a conventional client/server communication system.

FIG. 13 illustrates a block diagram depicting a conventional client/server communication system.

A communication system 1300 includes a multiplicity of networked regions with a sampling of regions denoted as a network region 1302 and a network region 1304, a global network 1306 and a multiplicity of servers with a sampling of servers denoted as a server device 1308 and a server device 1310.

Network region 1302 and network region 1304 may operate to represent a network contained within a geographical area or region. Non-limiting examples of representations for the geographical areas for the networked regions may include postal zip codes, telephone area codes, states, counties, cities and countries. Elements within network region 1302 and 1304 may operate to communicate with external elements within other networked regions or within elements contained within the same network region.

In some implementations, global network 1306 may operate as the Internet. It will be understood by those skilled in the art that communication system 1300 may take many different forms. Non-limiting examples of forms for communication system 1300 include local area networks (LANs), wide area networks (WANs), wired telephone networks, cellular telephone networks or any other network supporting data communication between respective entities via hardwired or wireless communication networks. Global network 1306 may operate to transfer information between the various networked elements.

Server device 1308 and server device 1310 may operate to execute software instructions, store information, support database operations and communicate with other networked elements. Non-limiting examples of software and scripting languages which may be executed on server device 1308 and server device 1310 include C, C++, C# and Java.

Network region 1302 may operate to communicate bi-directionally with global network 1306 via a communication channel 1312. Network region 1304 may operate to communicate bi-directionally with global network 1306 via a communication channel 1314. Server device 1308 may operate to communicate bi-directionally with global network 1306 via a communication channel 1316. Server device 1310 may operate to communicate bi-directionally with global network 1306 via a communication channel 1318. Network region 1302 and 1304, global network 1306 and server devices 1308 and 1310 may operate to communicate with each other and with every other networked device located within communication system 1300.

Server device 1308 includes a networking device 1320 and a server 1322. Networking device 1320 may operate to communicate bi-directionally with global network 1306 via communication channel 1316 and with server 1322 via a communication channel 1324. Server 1322 may operate to execute software instructions and store information.

Network region 1302 includes a multiplicity of clients with a sampling denoted as a client 1326 and a client 1328. Client 1326 includes a networking device 1334, a processor 1336, a GUI 1338 and an interface device 1340. Non-limiting examples of devices for GUI 1338 include monitors, televisions, cellular telephones, smartphones and PDAs (Personal Digital Assistants). Non-limiting examples of interface device 1340 include pointing device, mouse, trackball, scanner and printer. Networking device 1334 may communicate bi-directionally with global network 1306 via communication channel 1312 and with processor 1336 via a communication channel 1342. GUI 1338 may receive information from processor 1336 via a communication channel 1344 for presentation to a user for viewing. Interface device 1340 may operate to send control information to processor 1336 and to receive information from processor 1336 via a communication channel 1346. Network region 1304 includes a multiplicity of clients with a sampling denoted as a client 1330 and a client 1332. Client 1330 includes a networking device 1348, a processor 1350, a GUI 1352 and an interface device 1354. Non-limiting examples of devices for GUI 1338 include monitors, televisions, cellular telephones, smartphones and PDAs (Personal Digital Assistants). Non-limiting examples of interface device 1340 include pointing devices, mousse, trackballs, scanners and printers. Networking device 1348 may communicate bi-directionally with global network 1306 via communication channel 1314 and with processor 1350 via a communication channel 1356. GUI 1352 may receive information from processor 1350 via a communication channel 1358 for presentation to a user for viewing. Interface device 1354 may operate to send control information to processor 1350 and to receive information from processor 1350 via a communication channel 1360.

For example, consider the case where a user interfacing with client 1326 may want to execute a networked application. A user may enter the IP (Internet Protocol) address for the networked application using interface device 1340. The IP address information may be communicated to processor 1336 via communication channel 1346. Processor 1336 may then communicate the IP address information to networking device 1334 via communication channel 1342. Networking device 1334 may then communicate the IP address information to global network 1306 via communication channel 1312. Global network 1306 may then communicate the IP address information to networking device 1320 of server device 1308 via communication channel 1316. Networking device 1320 may then communicate the IP address information to server 1322 via communication channel 1324. Server 1322 may receive the IP address information and after processing the IP address information may communicate return information to networking device 1320 via communication channel 1324. Networking device 1320 may communicate the return information to global network 1306 via communication channel 1316. Global network 1306 may communicate the return information to networking device 1334 via communication channel 1312. Networking device 1334 may communicate the return information to processor 1336 via communication channel 1342. Processor 1346 may communicate the return information to GUI 1338 via communication channel 1344. User may then view the return information on GUI 1338.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6).

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breathe life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a system and method for mobile gaming according to the present invention will be apparent to those skilled in the art. Various aspects of the invention have been described above by way of illustration, and the specific embodiments disclosed are not intended to limit the invention to the particular forms disclosed. The particular implementation of the system and method for mobile gaming may vary depending upon the particular context or application. By way of example, and not limitation, system and method for mobile gaming described in the foregoing were principally directed to mobile computing implementations; however, similar techniques may instead be applied to home computing, automobiles, or unmanned vehicles, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system consisting of:
   means for starting at least one of an operating system initializing software and a mobile gaming module initializing software;
   means for storing said starting means;
   means for receiving an external input to said mobile gaming console;
   means for converting said input to a command, in which said input comprising at least one of, connect to a network request, link with a device request, memory access request, and check docking request;
   means for initializing an action in response to said command;
   means for checking whether said starting means requires at least one of, a network module, a link module, a memory module, a docking module, and a presentation module, for the execution of said action;
   means for accessing at least one of said modules for the execution of said action;
   means for performing a check for action completion of said starting means, wherein said check performing means is configured to check whether said action execution has been completed;
   means for presenting at least one result of said completed action;
   means for tracing a movement of said mobile gaming console;
   means for switching views with one or more shoulder buttons disposed at a proximate top of said mobile gaming console;
   means for docking said mobile gaming console, said docking means comprises means for holding a bottom portion of said mobile gaming console, said holding means being formed in a footprint of said mobile gaming console, said docking means further comprises means for electrically connecting said mobile gaming console to said docking means;
   means, disposed in a proximate bottom portion of said mobile gaming console, for engaging said holding means of said docking means, said engaging means of said mobile gaming console comprises means for coupling said electrical connecting means of said docking means;
   means for establishing communications between said docking means and said mobile gaming console;
   means for indicating said mobile gaming console is properly docked;
   means for indicating said mobile gaming console is charging or fully charged; and
   means for displaying said at least one result of said action from said docked mobile gaming console, said displaying means being connected to said docking means.

2. A method comprising the steps of:
   starting, with a processing module of a mobile gaming console, at least one of a mobile gaming console operating system initializing software and module initializing software, stored on a non-transitory computer readable medium;
   receiving, with a control module of said mobile gaming console, a user input, wherein said control module is coupled with at least one of, a navigational stick, a directional pad, a control button, a system button, and a touchscreen;
   converting, with said processing module, said user input to a command;
   initializing, with said processing module, an action in response to said command;
   accessing, with an access module, said mobile gaming modules for the execution of said action;
   performing, with said processing module, a check for action completion, wherein said performing step is configured to check whether said action execution has successfully been completed;
   presenting, with a presentation module, at least one result of said action;
   checking, with a docking connector of a docking station, or a docked mobile gaming console on a docking cradle formed in a footprint of said mobile gaming console, wherein said docking cradle is configured to hold said mobile gaming console in a certain position, and wherein said docking connector is configured to engage a docking port of said mobile gaming console while docked to said docking station;
   establishing communications with mobile gaming console via said engagement of said docking connector of said docking station and said docking port of said mobile gaming console;
   receiving a control signal from said mobile gaming console; and
   displaying said at least one result of said action from said docked mobile gaming console on a display screen connected to said docking station.

3. The method of claim 2, further comprising the step of receiving, with a link module, at least one of a connect to a network request, a link with a device request, a memory access request, and a check docking request.

4. The method of claim 3, further comprising the step of checking whether said processing module requires at least one of a network module, a link module, a memory module, a docking module, and a presentation module, for the execution of said request.

5. The method of claim 4, further comprising the step of sending data from the processing module to said network module to execute said connection to said network request.

6. The method of claim 5, further comprising the step of providing a 4G Hotspot with a 4G transceiver connected to said network module.

7. The method of claim 5, further comprising the steps of creating a network connection, and transferring data over said network connection.

8. The method of claim 4, further comprising the step of sending data from the processing module to said link module to execute said link with a device request.

9. The method of claim 8, further comprising the steps of checking wired or wireless links from other devices and modules, establishing a communications link with at least one of a connected device and module, and transferring data between said linking module and said at least one of a connected device and module.

10. The method of claim 4, further comprising the step of sending data from the processing module to said memory module to execute said memory access request.

11. The method of claim 10, further comprising the step of accessing a memory storage device for reading or writing, wherein a right side of said mobile gaming console comprises one or more removable storage slots for accepting at least one of an SD card, game cartridge, disc, and media card.

12. The method of claim 4, further comprising the step of sending data from the processing module to said docking module to execute said check docking request.

13. The method of claim 12, further comprising the steps of connecting at least one of an electronic component and module attached to the docking module with the docked mobile gaming console.

14. The method of claim 13, further comprising the step of indicating said mobile gaming console is properly docked to a docking station of said docking module and said mobile gaming console is charging, said indicating step including turning an indicator light of said docking station to a red light to indicate charging and light blue to indicate fully charge.

15. The method of claim 13, further comprising the step of receiving alarm or emergency notifications.

16. The method of claim 13, further comprising the step of displaying data on a larger display screen coupled to said docking station from said mobile gaming console.

17. The method of claim 2, further comprising the step of tracing said mobile gaming console movement with at least one of an accelerometer and a gyroscope sensor.

18. The method of claim 4, further comprising the steps of sending data from the processing module to said presentation module to execute a presentation of a result of said request and presenting the result of a completed task or action with at least one of a touch screen, speaker, and vibration on said mobile gaming console.

19. The method of claim 2, further comprising the step of switching views and display zooming with one or more shoulder buttons disposed at a proximate top of said mobile gaming console.

20. A system comprising:
means for starting at least one of, an operating system initializing software and at least one or more mobile gaming modules initializing software;
means for storing said starting means and said operating system initializing software and at least one or more of said mobile naming modules initializing software;
means for receiving an input, said input receiving means comprises receiving at least one of, a connect to a network request, link with a device request, memory access request, and check docking request;
means for converting said input to a command;
means for initializing an action in response to said command;
means for checking whether said starting means requires at least one of a network module, a link module, a memory module, a docking module, and a presentation module, for the execution of said action;
means for accessing at least one of said modules for the execution of said action;
means for performing a check for action completion of said starting means, said performing step is configured to check whether said action execution has successfully been completed; and
means for presenting at least one result of said action
means for docking said mobile gaming console, said docking means comprises means for holding said mobile gaming console, said holding means formed in a footprint of said mobile gaming console, said docking means further comprises means for electrically connecting said mobile gaming console to said docking means;
means, disposed in a proximate bottom portion of said mobile gaming console, for electrically engaging said docking means, said engaging means comprises means for electrically coupling said electrical connecting means of said docking means;
means for establishing communication between said docking means and said mobile gaming console;
means for indicating said mobile gaming console is properly docked;
means for indicating said mobile gaming console is charging or fully charged; and
means, connected to said docking means, for presenting said at least one result of said action from said docked mobile gaming console;
means for gathering video information, said video information gathering means comprises video information gathering means disposed at a front portion of said mobile gaming console, said video information gathering means further comprises video information gathering means disposed at a back portion of said mobile gaming console, said video gathering means further comprises means for recognizing a facial feature, said video gathering means further comprises means for automatically starting said mobile gaming console based on said facial recognition means as a safety feature, and
means for improving lighting conditions of an area, said lighting means being configured to improve lighting conditions for said video gathering means.

* * * * *